(12) United States Patent
Nakamura et al.

(10) Patent No.: US 12,483,084 B2
(45) Date of Patent: Nov. 25, 2025

(54) MOTOR PROTECTOR

(71) Applicant: UBUKATA INDUSTRIES CO., LTD., Nagoya (JP)

(72) Inventors: Yuuki Nakamura, Nagoya (JP); Kei Sasaki, Aichi (JP)

(73) Assignee: UBUKATA INDUSTRIES CO., LTD., Nagoya (JP)

( * ) Notice: Subject to any disclaimer, the term of this patent is extended or adjusted under 35 U.S.C. 154(b) by 327 days.

(21) Appl. No.: 18/012,142

(22) PCT Filed: Sep. 15, 2020

(86) PCT No.: PCT/JP2020/034913
§ 371 (c)(1),
(2) Date: Dec. 21, 2022

(87) PCT Pub. No.: WO2022/059067
PCT Pub. Date: Mar. 24, 2022

(65) Prior Publication Data
US 2023/0283140 A1 Sep. 7, 2023

(51) Int. Cl.
*H02K 5/10* (2006.01)
*H02K 5/22* (2006.01)
*H02K 11/25* (2016.01)

(52) U.S. Cl.
CPC .............. *H02K 5/10* (2013.01); *H02K 5/225* (2013.01); *H02K 11/25* (2016.01)

(58) Field of Classification Search
CPC ........... H02K 5/10; H02K 11/25; H02K 5/225
(Continued)

(56) References Cited

U.S. PATENT DOCUMENTS 4,843,363 A * 6/1989 Ubukata ............ H01H 37/5418
337/368
4,866,408 A * 9/1989 Petraitis ............ H01H 37/5418
337/368
(Continued)

FOREIGN PATENT DOCUMENTS

CN 203859064 U 10/2014
CN 105264628 A 1/2016
(Continued)

OTHER PUBLICATIONS

JP H06295651 (A) English translation (Year: 1994).*
(Continued)

*Primary Examiner* — Anatoly Vortman
(74) *Attorney, Agent, or Firm* — KARCESKI IP LAW, PLLC

(57) ABSTRACT

A motor protector according to an embodiment includes a hermetic container, two conducting terminal pins, two fixed contact point support bodies, two fixed contact points, two movable contact points, and a thermal reaction plate. The fixed contact point support body is configured, by bending work on a plate material, to integrally include a conducting terminal pin side region, a fixed contact point side region arranged such that a space region is sandwiched therebetween and provided with a fixed contact point, and a connection region provided across the space region and connecting the conducting terminal pin side region and the fixed contact point side region. The total width dimension of the connection region is set to be smaller than the total width dimension of the space region.

7 Claims, 18 Drawing Sheets

(58) Field of Classification Search
USPC .......................................................... 337/298
See application file for complete search history.

(56) References Cited

U.S. PATENT DOCUMENTS

| | | | | |
|---|---|---|---|---|
| 5,015,985 | A * | 5/1991 | Ubukata | H01H 37/5418 |
| | | | | 337/368 |
| 5,107,241 | A * | 4/1992 | Ubukata | H01H 37/20 |
| | | | | 337/368 |
| 5,121,095 | A * | 6/1992 | Ubukata | H01H 37/5427 |
| | | | | 337/380 |
| 5,212,465 | A | 5/1993 | Mizutani et al. | |
| 6,005,471 | A | 12/1999 | Higashikata et al. | |
| 7,298,239 | B2 * | 11/2007 | Yamada | H01H 81/02 |
| | | | | 337/112 |
| 7,301,434 | B1 * | 11/2007 | Pisuk | H01H 81/02 |
| | | | | 337/380 |
| 8,717,140 | B2 * | 5/2014 | Hori | H01H 37/5427 |
| | | | | 337/365 |
| 2002/0158746 | A1 * | 10/2002 | Lamborghini | H01H 37/54 |
| | | | | 337/365 |
| 2007/0262844 | A1 * | 11/2007 | Pisuk | H01H 37/20 |
| | | | | 337/333 |
| 2011/0210813 | A1 * | 9/2011 | Higashikata | H01H 37/002 |
| | | | | 337/142 |
| 2015/0364282 | A1 * | 12/2015 | Higashikata | H01H 37/12 |
| | | | | 337/380 |

FOREIGN PATENT DOCUMENTS

| | | |
|---|---|---|
| JP | H0290433 A | 3/1990 |
| JP | H06295651 A | 10/1994 |
| JP | 2002352685 A | 12/2002 |
| JP | 2006331693 A | 12/2006 |

OTHER PUBLICATIONS

Indian Office Action dated Apr. 26, 2023, for Indian Patent Application No. 202347007391.
Korean Office Action dated Jul. 15, 2024, for Korean Patent Application No. 10-2022-7044102.
Japanese Office Action dated Jul. 11, 2023, for Japanese Patent Application No. 2022-550070.
International Search Report dated Nov. 24, 2020, for International Patent Application No. PCT/JP2020/034913.
Extended European Search Report dated Apr. 26, 2024, for European Patent Application No. 20954053.3.
Chinese Office Action dated Nov. 19, 2024, for Chinese Patent Application No. 2020801040315.

* cited by examiner

MOTOR PROTECTOR

CROSS-REFERENCE TO RELATED APPLICATION(S)

This is a National Stage Entry into the United States Patent and Trademark Office from International Patent Application No. PCT/JP2020/034913, filed on Sep. 15, 2020, the entire contents of which are incorporated herein by reference.

FIELD OF THE INVENTION

An embodiment of the present invention relates to a motor protector.

BACKGROUND OF THE INVENTION

There have been proposed a large number of motor protectors for protecting a motor incorporated in a hermetic electric compressor, especially a three-phase motor from burning. This type of motor protector is connected to the neutral point of a three-phase star connection inside the hermetic electric compressor. The motor protector includes a thermal reaction plate that operates due to the ambient temperature inside the compressor or the heat generated by the current flowing through the motor protector, and the operation of this thermal reaction plate causes the circuit to open, thereby cutting off energization to all windings of the motor.

Here, a condition where one or more phases of a three-phase power supply to be supplied to the motor are not energized due to disconnection of a power supply line, contact failure of a wire connection portion or control switch, breaking of wires inside the motor or the like is called "open-phase". When the motor is energized in an open-phase state at the time of starting the compressor, the motor falls into a locked state in which the rotor of the motor is not rotated because the torque is insufficient, so that a starting current continues to flow through the motor. The starting current is larger than an operating current in a normal state. Therefore, if the starting current continues to flow through the motor in the open-phase state, the balance among the respective phases at the neutral point would be lost, which causes an abnormal current to flow. Generally, the starting current when the motor is tried to start from such an open-phase state is called "open-phase lock current".

When the rotor falls into a locked state due to open-phase, it is impossible to cool the motor by the flow of refrigerant or refrigerating machine oil, that is, lubricating oil. Further, when the open-phase lock current continues to flow through the motor while the rotor is kept in the locked state, the temperature of the motor rises rapidly due to Joule heat, and in the worst case, the motor may burn out. Therefore, it is important to detect the open-phase lock current and cut off power supply to the motor.

However, if the rated output of the compressor is small, that is, if the rated current of the motor is small, the open-phase lock current would also be small. As the open-phase lock current becomes smaller, Joule heat generated by the open-phase lock current also becomes smaller, so that it takes time for the temperature inside the motor protector to rise. As a result, when the open-phase lock occurs, the thermal reaction plate cannot be heated to the operating temperature in a short time, and it takes time to cut off the open-phase lock current due to the operation of the motor protector, and meanwhile the temperature of the motor may rise to a dangerous level.

In this case, lowering the operating temperature of the thermal reaction plate can be considered as one of means for shortening the time taken until the cutoff. However, the motor protector has not only an overcurrent protection function, but also an overheat protection function. Therefore, when the overheat protection characteristics of the motor protector is taken into consideration, it is necessary to set the operating temperature of the thermal reaction plate to a level that does not allow the thermal reaction plate to operate with heat generated during normal use of the compressor. Therefore, simply lowering the operating temperature of the thermal reaction plate causes the overheat protection characteristics to be sacrificed.

SUMMARY OF THE INVENTION

The present embodiment has been made in view of the above circumstances, and has an object to provide a motor protector that can respond in a short time without sacrificing overheat protection characteristics even with a relatively small open-phase lock current.

A motor protector according to an embodiment comprises: a hermetic container airtightly configured to include a dome-shaped housing and a cover plate, the cover plate being provided at an end portion on an opening side of the housing; two conducting terminal pins, each conducting terminal pin being provided in the hermetic container so as to penetrate through the cover plate, one end portion of the conducting terminal pin being inserted inside the hermetic container, an other end portion of the conducting terminal pin being exposed to an outside of the hermetic container; two fixed contact point support bodies, each fixed contact point support body being provided inside the hermetic container so as to correspond to a respective one of the conducting terminal pins, one end portion of the fixed contact point support body being fixed to the one end portion of the conducting terminal pin; two fixed contact points, each fixed contact point being provided inside the hermetic container, the fixed contact point being provided at an end portion of a respective one of the two fixed contact point support bodies, the end portion being opposite to an end portion of the fixed contact point support body where the conducting terminal pin is provided; two movable contact points provided inside the hermetic container and corresponding to the two fixed contact points; and a thermal reaction plate provided inside the hermetic container, the two movable contact points being attached to the thermal reaction plate, the thermal reaction plate being configured to bring each of the movable contact points into contact with a respective one of the fixed contact points to close the two fixed contact points in a normal state where the thermal reaction plate is not in operation, and deform the movable contact point in a direction away from the respective one of the fixed contact points to open the two fixed contact points when the thermal reaction plate operates due to an ambient temperature inside the hermetic container reaching a predetermined temperature. The fixed contact point support body is configured, by bending work on a plate material, to integrally include a conducting terminal pin side region where the conductive terminal pin is provided, a fixed contact point side region where the fixed contact point is provided, the fixed contact point side region being arranged such that a space region formed to penetrate through the fixed contact point support body is sandwiched between the conducting terminal pin side region and the fixed contact point side region, and a connection region provided across the space region and connecting the conducting terminal pin side region and the fixed contact point side region, and a total width dimension of the connection region is set to be smaller than a total width dimension of the space region.

DESCRIPTION OF EMBODIMENT(S) OF THE INVENTION

Figure 1:
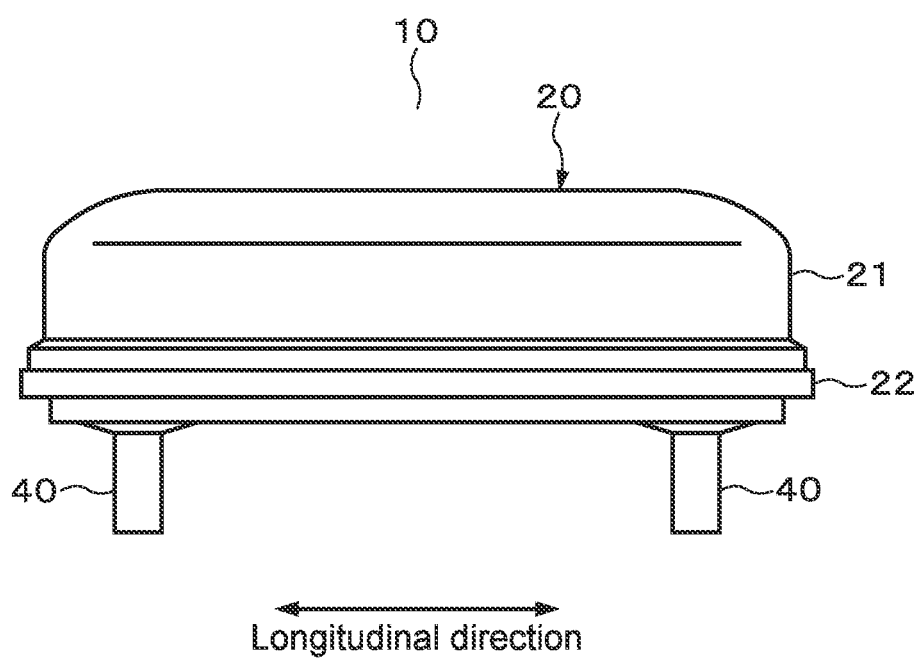
FIG. 1 is an external view showing an example of a motor protector according to an embodiment.

An embodiment of a motor protector to which the present invention is applied will be described below with reference to the drawings. A motor protector 10 shown in FIG. 1 and the like is a motor protector suitable for a motor incorporated in a hermetic electric compressor used in an air conditioner or the like, particularly a three-phase motor. The motor protector 10 is used while connected to, for example, a neutral point of the three-phase motor.

Figure 2:
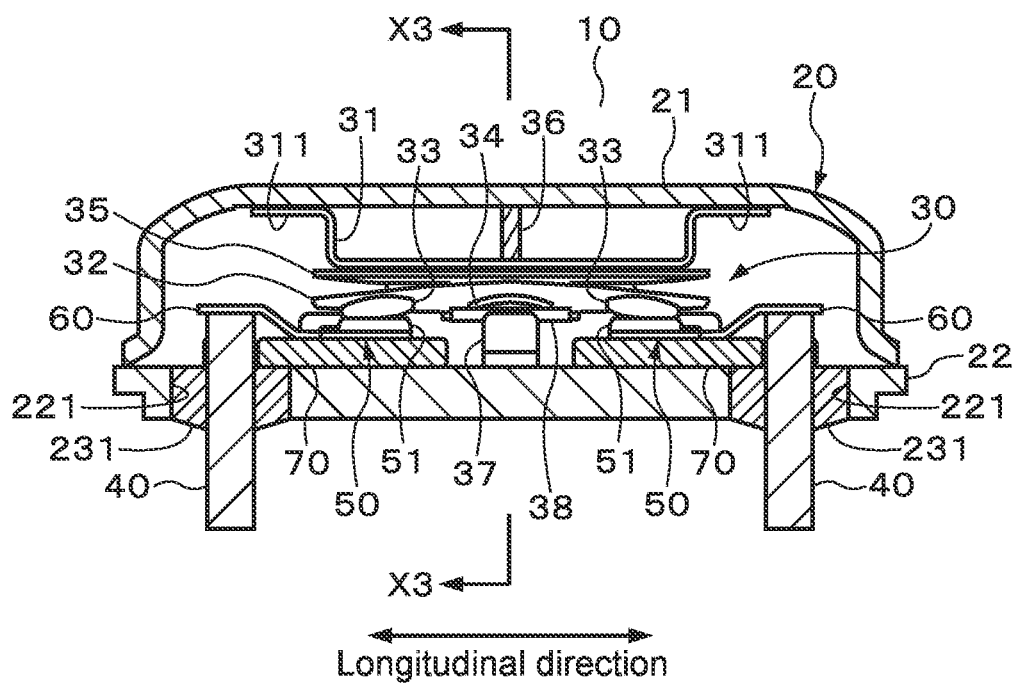
FIG. 2 is a cross-sectional view showing the example of the motor protector according to the embodiment.
Figure 3:
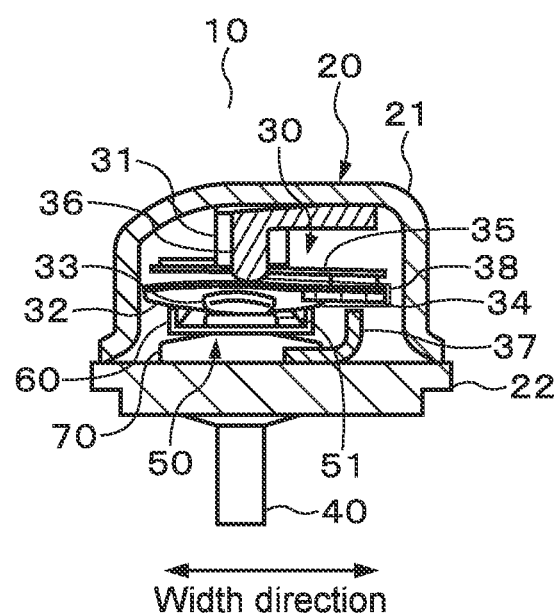
FIG. 3 is a cross-sectional view of the example of the motor protector according to the embodiment, which is taken along line X3-X3 of FIG. 2.
Figure 4:
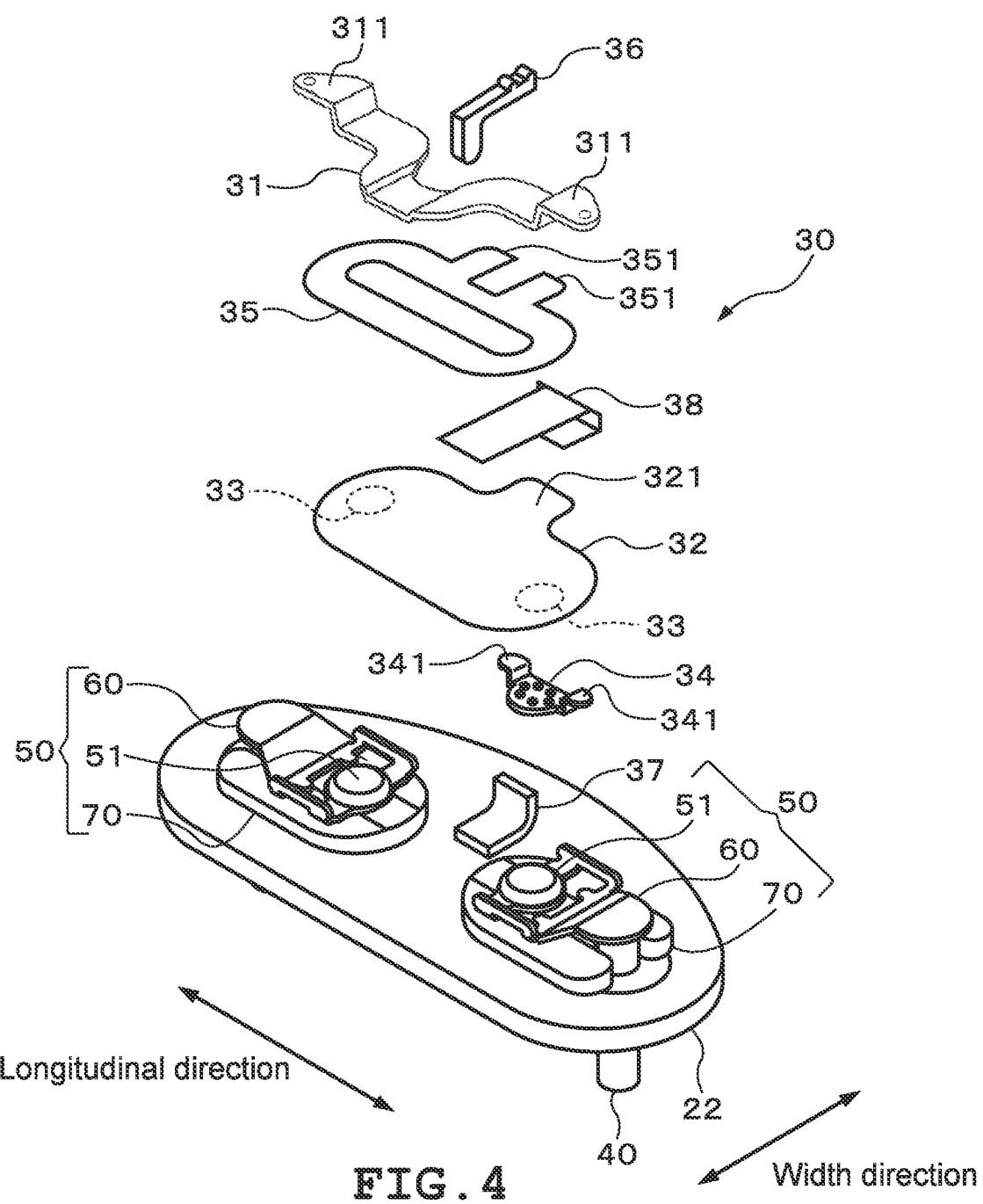
FIG. 4 is an exploded perspective view showing the example of the motor protector according to the embodiment in a state where a housing is removed.
Figure 5:
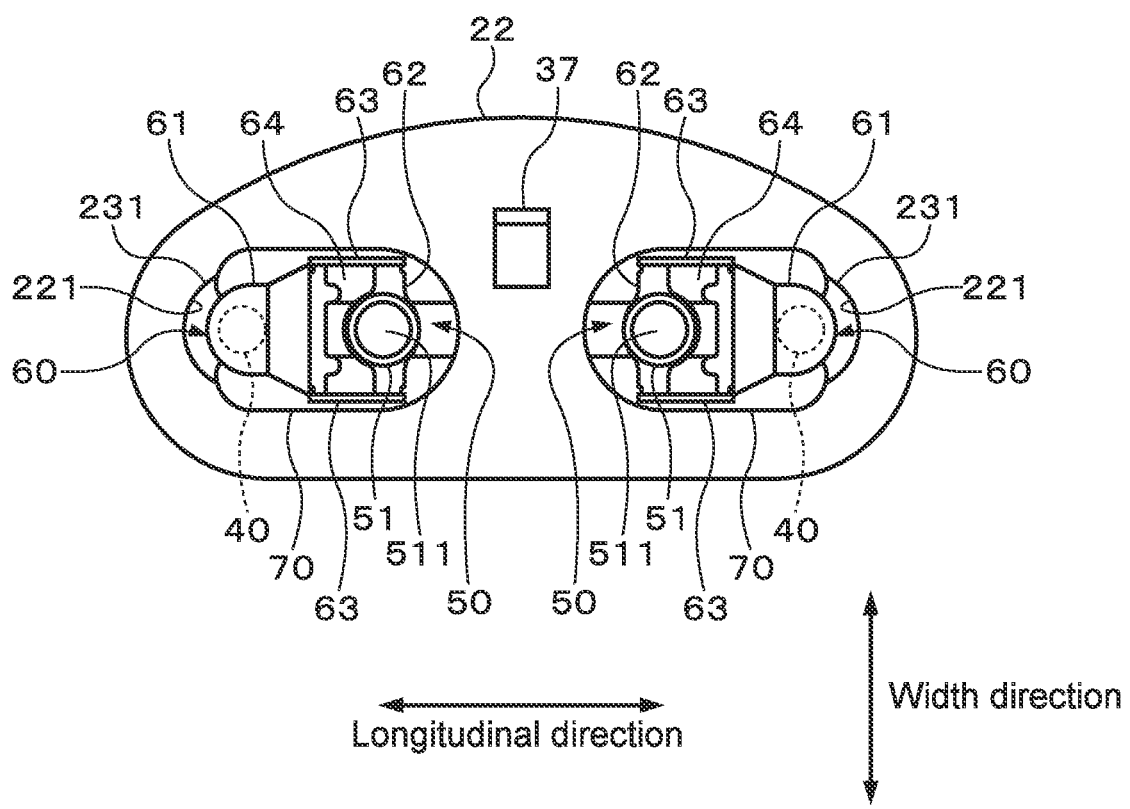
FIG. 5 is a plan view showing the example of the motor protector according to the embodiment in a state where the housing and a movable contact point mechanism are removed.

The motor protector 10 operates to open the circuit when a predetermined abnormal current flows through the motor protector 10 to generate heat, or when the motor itself generates heat due to some abnormality, so that the ambient temperature around it rises to a predetermined temperature. As a result, the motor protector 10 has a function of disconnecting the neutral point of the three-phase motor and cutting off the power supply to all windings of the motor. The motor protector 10 includes a hermetic container 20, a movable contact point mechanism 30, two conducting terminal pins 40, and fixed contact point mechanisms 50 as also shown in FIGS. 2 to 4. Both the movable contact point mechanism 30 and the fixed contact point mechanisms 50 are provided within the hermetic container 20.

The hermetic container 20 forms an outer shell of the motor protector 10, and thus is configured to have airtightness and watertightness. The hermetic container 20 is configured to include a housing 21 and a cover plate 22 as shown in FIG. 2 and the like. The housing 21 is made of, for example, metal, and has an elongated dome shape with one end portion thereof being opened. The cover plate 22 is, for example, a plate-like member made of metal, and is formed in a shape conforming to the opening portion of the housing 21. The cover plate 22 is fixed to the end portion on the opening side of the housing 21 by welding the entire circumference or the like to block the opening of the housing 21 airtightly and watertightly.

The movable contact point mechanism 30 has a function of operating to cut off electrical connection with the fixed contact point mechanisms 50 when the ambient temperature inside the hermetic container 20 reaches a predetermined temperature or more. As shown in FIG. 4, the movable contact point mechanism 30 includes a thermal reaction plate support body 31, a thermal reaction plate 32, two movable contact points 33, a fixing piece 34, an elastic plate 35, a pressing piece 36, a stiffening plate 37, and an insertion piece 38.

The thermal reaction plate support body 31 is fixed to the inner surface of the housing 21 and has a function of supporting the thermal reaction plate 32. The thermal reaction plate support body 31 is formed, for example, to have rigidity and by bending an elongated metal plate. The thermal reaction plate support body 31 is formed in a symmetrical shape about the center in a longitudinal direction. The thermal reaction plate support body 31 has two fixing portions 311. The fixing portions 311 are portions formed by bending both the end portions of the thermal reaction plate support body 31 so that the end portions are parallel to the inner surface of the housing 21. The fixing portions 311 are fixed to the inner surface of the housing 21 by welding or the like. Also, the thermal reaction plate support body 31 is formed in such a shape that it does not interfere with the elastic plate 35 and the pressing piece 36.

The thermal reaction plate 32 has a function of moving movable contact points 33 when the ambient temperature in the hermetic container 20 reaches a predetermined temperature or more, that is, when its own temperature reaches a predetermined temperature or more. The thermal reaction plate 32 is formed, for example, by drawing an electrically conductive thin plate of bimetal or trimetal into a shallow plate shape. The thermal reaction plate 32 is formed in an elliptical shape that is elongated in the longitudinal direction of the motor protector 10 as a whole. The two movable contact points 33 are provided on a surface on the cover plate 22 side of the thermal reaction plate 32 at both end portions of the elliptical shape of the thermal reaction plate 32 by welding or the like. The thermal reaction plate 32 has a fixing portion 321. The fixing portion 321 is formed in such a shape that a center portion in the longitudinal direction of the thermal reaction plate 32 is protruded outward in a substantially rectangular shape in the width direction of the thermal reaction plate 32. A fixing piece 34 is provided on a surface on the cover plate 22 side of the fixing portion 321 by welding or the like.

The thermal reaction plate 32 maintains a closed state between two fixed contact points 51 described later by bringing the respective movable contact points 33 into contact with the fixed contact points 51 in a normal state where the thermal reaction plate 32 is not in operation. Further, the thermal reaction plate 32 operates when the ambient temperature inside the hermetic container 20 reaches a predetermined temperature, so that each movable contact point 33 is deformed in a direction away from each fixed contact point 51, thereby opening the fixed contact points 51.

As shown in FIG. 2 and the like, both the end sides in the longitudinal direction of the thermal reaction plate 32, that is, both the sides on which the two movable contact point 33 are located are curved toward the cover plate 22 with the center portion in the longitudinal direction of the thermal reaction plate 32 as an apex. When the ambient temperature in the hermetic container 20 reaches a predetermined temperature, the thermal reaction plate 32 reverses its bending direction, so that the movable contact points 33 move in a direction away from the cover plate 22.

The thermal reaction plate 32 is fixed to the elastic plate 35 via the fixing piece 34. The fixing piece 34 is formed, for example, by bending work on a metal plate. A center portion of a surface on an opposite side of the fixing piece 34 to the cover plate 22 is fixed to the fixing portion 321 of the thermal reaction plate 32 by welding or the like, and both the end portions of the fixing piece 34 are fixed to attachment portions 351 of the elastic plate 35 by welding or the like.

The movable contact point 33 is formed of, for example, a metal material having electrical conductivity or a material such as a clad material of silver oxide and copper or a copper alloy. The two movable contact points 33 are provided at positions facing the two fixed contact points 51 described later in the thermal reaction plate 32. The movable contact point 33 is formed in a substantially hemispherical shape protruding from a surface on the cover plate 22 side of the thermal reaction plate 32 toward the cover plate 22.

The elastic plate 35 has a function of elastically supporting the thermal reaction plate 32 via the fixing piece 34. The elastic plate 35 is formed of, for example, an elastically deformable metal thin plate, and has a substantially oval shape as a whole, and it has a substantially elliptic shape as a whole, and has a slot-shaped opening portion at a center portion thereof. The elastic plate 35 has two attachment portions 351 protruding from the center portion in the longitudinal direction of the elliptic shape. Each attachment portion 341 of the fixing piece 34 is fixed to each attachment portion 351 of the elastic plate 35 by welding or the like. As a result, the thermal reaction plate 32 is elastically connected to the elastic plate 35 via the fixing piece 34.

Further, the thermal reaction plate support body 31 is fixed to a portion on an opposite side to the attachment portions 351 in the width direction of the motor protector 10 and a center portion in the longitudinal direction by welding or the like. As a result, as shown in FIG. 2, the elastic plate 35 is supported by the thermal reaction plate support body 31 in a double-supported beam state with the center portion in the longitudinal direction of the motor protector 10 as a fulcrum when viewed in the longitudinal direction of the motor protector 10.

As shown in FIG. 3, the elastic plate 35 is supported by the thermal reaction plate support body 31 in a cantilever beam state with one side in the width direction of the motor protector 10 set as a fixed end and the other side set as a free end when viewed in the width direction of the motor protector 10. As a result, even if the thermal reaction plate 32 is arranged to be slightly inclined with respect to the cover plate 22, that is, with respect to the two fixed contact points 51 described later, pressing forces acting on the two movable contact points 33 by the elastic force of the elastic plate 35 can be balanced, that is, the variation in contact pressure between the two movable contact points 33 can be absorbed, thereby balancing the contact pressure.

The pressing piece 36 serves to calibrate the operating temperature of the motor protector 10. The pressing piece 36 is formed of, for example, a metal member having sufficient rigidity, and formed in a shape elongated in the width direction of the motor protector 10. The pressing piece 36 is provided at a center portion of the motor protector 10 in the longitudinal direction. One end portion in the longitudinal direction of the pressing piece 36 is fixed to the inner surface of the housing 21 by welding or the like. The other end portion in the longitudinal direction of the pressing piece 36 is in contact with a curved apex portion of the thermal reaction plate 32 to apply pressing force to the curved apex portion in a state where the thermal reaction plate 32 is not in operation.

The temperature calibration of the motor protector 10 is performed by assembling respective components in the hermetic container 20, welding the housing 21 and the cover plate 22 together to complete the hermetic container 20, and then pressing and deforming a portion of the housing 21 at which the pressing piece 36 is provided. When the portion of the housing 21 corresponding to the pressing piece 36 is pushed into the hermetic container 20, the pressing piece 36 moves toward the cover plate 22, and presses the center portion of the thermal reaction plate 32, so that the curved shape of the thermal reaction plate 32 is deformed. In this way, by pressing and deforming the portion of the housing 21 at which the pressing piece 36 is provided, it is possible to adjust the deformation of the thermal reaction plate 32 at a desired temperature.

As shown in FIG. 3, the stiffening plate 37 is configured by, for example, a member formed of metal and having an L-shape, and is provided at a center portion in the longitudinal direction of the cover plate 22 and at a position facing the fixing piece 34. When the elastic plate 35 is bent toward the cover plate 22 until a predetermined amount with the connection portion thereof to the thermal reaction plate support body 31 as a fulcrum, the elastic plate 35 comes into contact with the stiffening plate 37 via the fixing piece 34. As a result, the stiffening plate 37 prevents the elastic plate 35 and the thermal reaction plate 32 from sagging by the predetermined amount or more.

As shown in FIG. 4, the insertion piece 38 is formed, for example, by bending an electrically insulating sheet-like member into a U-shape. The insertion piece 38 is inserted in between the thermal reaction plate 32 and the pressing piece 36 and in between the fixing piece 34 and the stiffening plate 37. The insertion piece 38 has a function of preventing a bypass current from flowing between the thermal reaction plate 32 and the stiffening plate 37 and between the thermal reaction plate 32 and the pressing piece 36 via the fixing piece 34. It is preferable that the insertion piece 38 is formed of a member having electric insulation, heat resistance, strength and flexibility such as polyamide paper, but it is not limited to this member. Further, if the bypass current does not pose any substantial problem, the insertion piece 38 may be omitted, or the insertion piece 38 may be inserted either in between the thermal reaction plate 32 and the pressing piece 36 or in between the fixing piece 34 and the stiffening plate 37.

The conducting terminal pin 40 is formed of, for example, an electrically conductive member such as metal, and is formed, for example, in a cylindrical bar shape. The two conducting terminal pins 40 are respectively passed through hole portions 221 formed in the cover plate 22, and are attached to the cover plate 22 such that one end portions thereof are inserted in the hermetic container 20 and the other end portions thereof are exposed to the outside of the hermetic container 20. An electrically insulating filler 231 such as glass is provided between the inside of the hole portion 221 and the conducting terminal pin 40. As a result, the conducting terminal pins 40 are fixed to the cover plate 22 in a state of being electrically insulated from each other and in an airtight and watertight state.

The fixed contact point mechanisms 50 are provided inside the hermetic container 20, and include two fixed contact points 51, two fixed contact point support bodies 60, and two spacers 70. One fixed contact point 51, one fixed contact point support body 60, and one spacer 70 constitute one set. The two sets of fixed contact points 51, fixed contact point support bodies 60 and spacers 70 correspond to the conducting terminal pins 40 respectively, and are arranged symmetrically with respect to the cover plate 22.

The fixed contact points 51 are formed of, for example, a metal material having electrical conductivity, or a material such as a clad material of silver oxide and copper or a copper alloy. Each of the two fixed contact points 51 is fixed, by welding or the like, to a surface on the opposite side to a surface of each fixed contact point support body 60 on which the conducting terminal pin 40 is provided, at an end portion on an opposite side to an end portion of each fixed contact point support body 60 at which the conducting terminal pin 40 is provided.

The fixed contact point support body 60 has a function of electrically connecting the conducting terminal pin 40 and the fixed contact point 51. The fixed contact point support body 60 is formed of a plate material having electrical conductivity such as a metal plate. One end portion of the fixed contact point support body 60 is fixed, by welding or the like, to an end portion of the conducting terminal pin 40 located inside the hermetic container 20 out of both the end portions of the conducting terminal pin 40. The fixed contact point 51 is provided at the other end portion of the fixed contact point support body 60.

In this case, in a normal state where the thermal reaction plate 32 is not in operation, each fixed contact point 51 is in contact with the opposing movable contact point 33. Therefore, in this case, the two fixed contact points 51 are electrically conducted to each other via the movable contact points 33 and the thermal reaction plate 32. In other words, in this case, the two conducting terminal pins 40 are electrically connected to each other via the fixed contact point support bodies 60, the fixed contact points 51, the movable contact points 33 and the thermal reaction plate 32.

Figure 9:
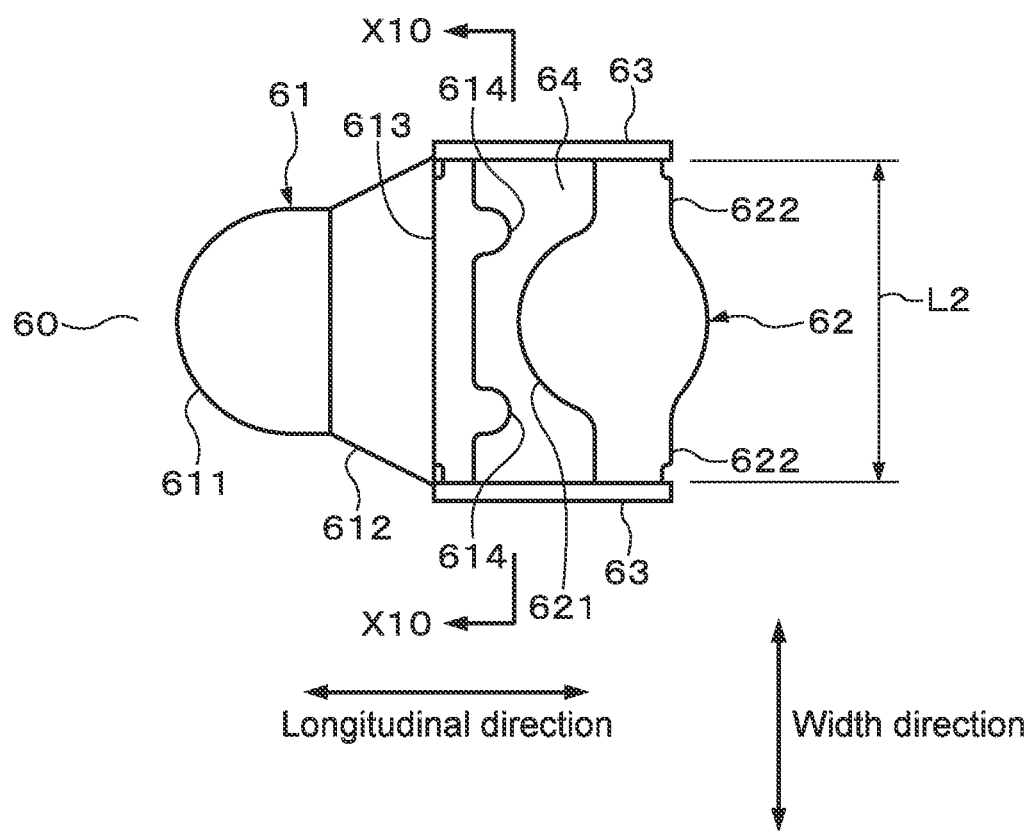
FIG. 9 is a plan view showing an example of a fixed contact point support body in the example of the motor protector according to the embodiment.

For example, as shown in FIG. 9, the fixed contact point support body 60 is formed in a symmetrical shape with respect to a line extending in the longitudinal direction through the center in the width direction of the fixed contact point support body 60. The conducting terminal pin 40 is fixed to one end portion of the fixed contact point support body 60 by welding or the like, and the fixed contact point 51 is fixed to the other end portion by welding or the like. In this case, the fixed contact point support body 60 is set in a cantilever beam state where an end portion side thereof at which the conducting terminal pin 40 is provided is set as a fixed end while an end portion side thereof at which the fixed contact point 51 is provided is set as a free end. Therefore, the fixed end side of the fixed contact point support body 60 on which the conducting terminal pin 40 is provided serves as a fulcrum, and the free end side of the fixed contact point support body 60 on which the fixed contact point 51 is provided is swingable.

As shown in FIGS. 6 to 9, the fixed contact point support body 60 has a conducting terminal pin side region 61, a fixed contact point side region 62, and connection regions 63. The conducting terminal pin side region 61 is a region where the end portion of the conducting terminal pin 40 is provided, and is located to be closer to the conducting terminal pin 40 side than the fixed contact point side region 62. The fixed contact point side region 62 is a region where the fixed contact point 51 is provided, and is located to be closer to the fixed contact point 51 side than the conducting terminal pin side region 61.

Figure 6:
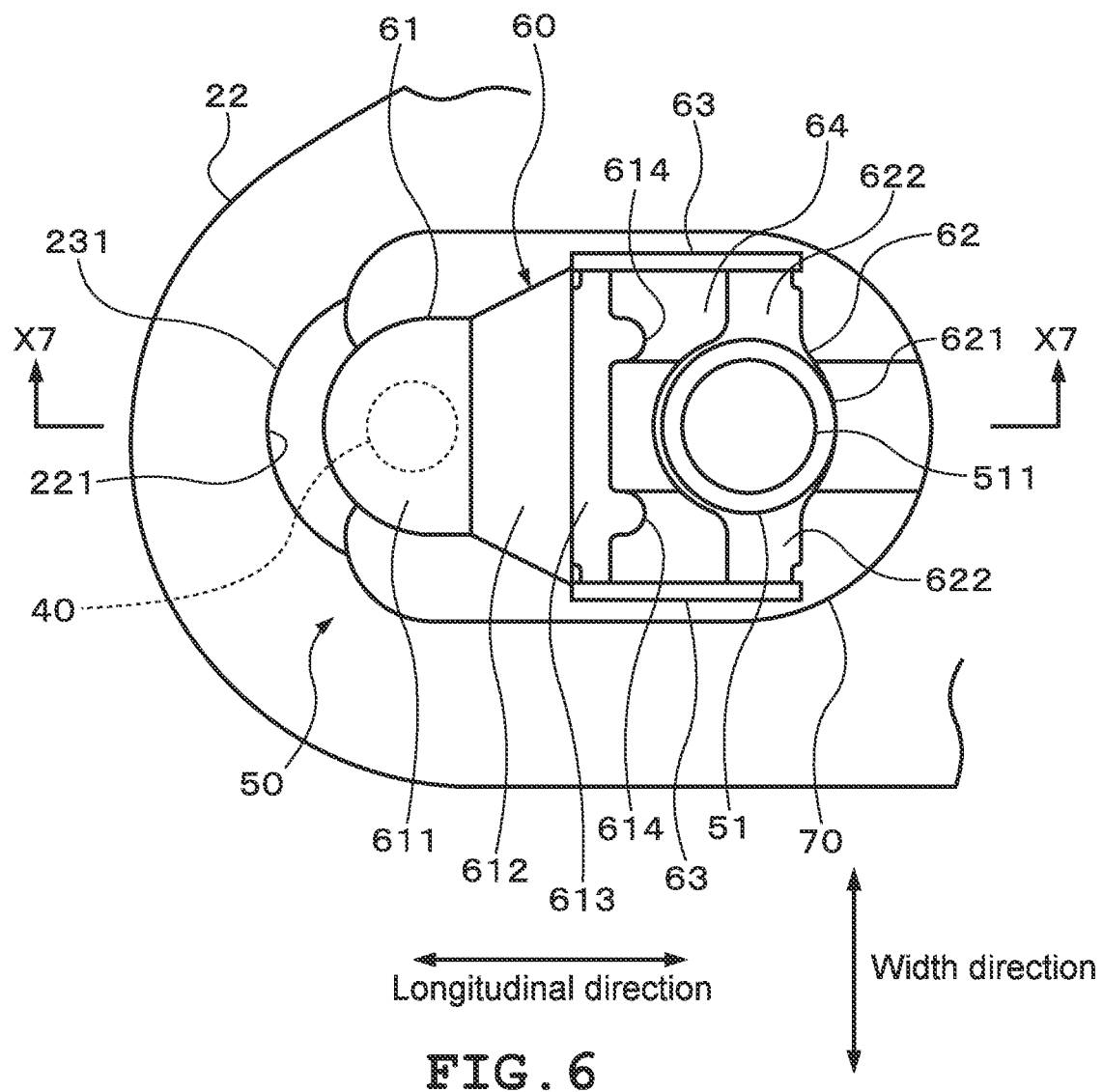
FIG. 6 is an enlarged view showing an enlarged part of a fixed contact point mechanism in the example of the motor protector according to the embodiment.

Hereinafter, as shown in FIG. 6, a direction in which the conducting terminal pin side region 61 and the fixed contact point side region 62 are mutually connected to each other is defined as the longitudinal direction of the fixed contact point support body 60, and a direction which is perpendicular to this longitudinal direction and parallel to the cover plate 22 is defined as the width direction of the fixed contact point support body 60. Note that the longitudinal direction and width direction of the fixed contact point support body 60 are coincident with the longitudinal direction and width direction of the motor protector 10 in plan view.

The conducting terminal pin side region 61 integrally includes a semicircular portion 611, a trapezoidal portion 612, a rectangular portion 613, and at least one, in this case two protruding portions 614. In this specification, the term "integrally" means a seamless structure obtained by sheet metal working, various molding processing, and the like. In the conducting terminal pin side region 61, the semicircular portion 611, the trapezoidal portion 612, the rectangular portion 613, and the two protruding portions 614 are arranged in order from the conducting terminal pin 40 side toward the fixed contact point 51 side.

The semicircular portion 611 is formed in a substantially semicircular shape that is flat and bulges toward the opposite side to the fixed contact point 51. The radius of the semicircular portion 611 is larger than the radius of the conducting terminal pin 40. The end portion of the conducting terminal pin 40 is fixed to the center portion of the semicircular portion 611. The trapezoidal portion 612 is formed in a trapezoidal shape that is flat and spreads toward the rectangular portion 613 side, that is, the fixed contact point side region 62 side. In other words, the trapezoidal portion 612 has an upper base at the boundary between the semicircular portion 611 and the trapezoidal portion 612, and a lower base at the boundary between the trapezoidal portion 612 and the rectangular portion 613. In the trapezoidal portion 612, the lower base is set to be longer than the upper base. Further, the trapezoidal portion 612 connects the semicircular portion 611 and the rectangular portion 613, and forms an inclined surface that descends from the semicircular portion 611 toward the rectangular portion 613.

The rectangular portion 613 is formed in a substantially rectangular shape that is flat and elongated in the width direction of the fixed contact point support body 60. The rectangular portion 613 is located to be closer to the cover plate 22 than the semicircular portion 611. The two protruding portions 614 are provided so as to protrude in a substantially semicircular shape from the edge portion of the rectangular portion 613 toward the fixed contact point 51. The two protruding portions 614 are arranged to be spaced apart from each other in the longitudinal direction of the rectangular portion 613, that is, in the width direction of the fixed contact point support body 60. The protruding portions 614 are configured to be flush with the rectangular portion 613.

The fixed contact point side region 62 is a region where the fixed contact point 51 is provided, and is formed in such a shape that the center portion in the width direction of the fixed contact point support body 60 bulges circularly. The fixed contact point side region 62 has a circular portion 621 and side portions 622. The circular portion 621 is formed in such a shape that the center portion in the width direction of the fixed contact point support body 60 bulges circularly in the fixed contact point side region 62. The side portions 622 are provided on both sides of the circular portion 621 in the width direction of the fixed contact point support body 60. The dimension in the longitudinal direction of the fixed contact point support body 60 at the side portions 622 are smaller than the dimension in the longitudinal direction of the fixed contact point support body 60 at the circular portion 621. In other words, in the fixed contact point side region 62, the dimension in the longitudinal direction of the fixed contact point support body 60 at both the end portions in the width direction of the fixed contact point support body 60 is set to be smaller than the dimension in the longitudinal direction of the fixed contact point support body 60 at the center portion in the width direction of the fixed contact point support body 60.

The fixed contact point side region 62 is arranged with a space region 64 interposed between the fixed contact point side region 62 and the conducting terminal pin side region 61. The space region 64 is a hole or cut-out which is formed so as to penetrate through the fixed contact point support body 60 in the thickness direction thereof. In the case of this embodiment, the space region 64 is configured by a hole which is formed so as to penetrate through the fixed contact point support body 60 in the thickness direction thereof. The fixed contact point side region 62 is configured to be flush with the rectangular portion 613 and the protruding portions 614. In this embodiment, the space region 64 is formed over the entire region in the width direction of the fixed contact point support body 60. In other words, the conducting terminal pin side region 61 and the fixed contact point side region 62 are not in contact with each other.

In this case, the shortest distance between the conducting terminal pin side region 61 and the fixed contact point side region 62, including the protruding portions 614 and the circular portion 621, is set to a distance that does not cause a short-circuit even when an open-phase lock current flows. In other words, a distance which does not cause a short-circuit even when an open-phase lock current flows through the fixed contact point support body 60 is ensured between the rectangular portion 613 and the protruding portions 614 constituting a part of the conducting terminal pin side region 61 and the circular portion 621 constituting a part of the fixed contact point side region 62.

The connection regions 63 are provided across the space region 64, and connect the conducting terminal pin side region 61 and the fixed contact point side region 62. The connection region 63 is formed in a rectangular shape that is elongated in the longitudinal direction of the fixed contact point support body 60, and connects both end side portions of the rectangular portion 613 in the width direction of the fixed contact point support body 60 to both end side portions of the fixed contact point side region 62 in the width direction of the fixed contact point support body 60, that is, the side portions 622.

In the case of this embodiment, the connection regions 63 are provided on both sides in the width direction of the fixed contact point support body 60 in the space region 64. In other words, the fixed contact point support body 60 has the two connection regions 63 provided on both end sides in the width direction of the fixed contact point support body 60. In the case of this embodiment, the conducting terminal pin side region 61 and the fixed contact point side region 62 are physically and electrically connected to each other by only the two connection regions 63 provided on both end sides in the width direction of the fixed contact point support body 60.

In this case, the space region 64 exists on a straight line connecting the conducting terminal pin 40 and the fixed contact point 51 along the surface of the fixed contact point support body 60. Therefore, the current flowing between the conducting terminal pin 40 and the fixed contact point 51 does not pass through a route connecting the conducting terminal pin 40 and the fixed contact point 51 by the straight line, but passes through a route bypassing the space region 64, that is, through the connection regions 63.

Figure 10:
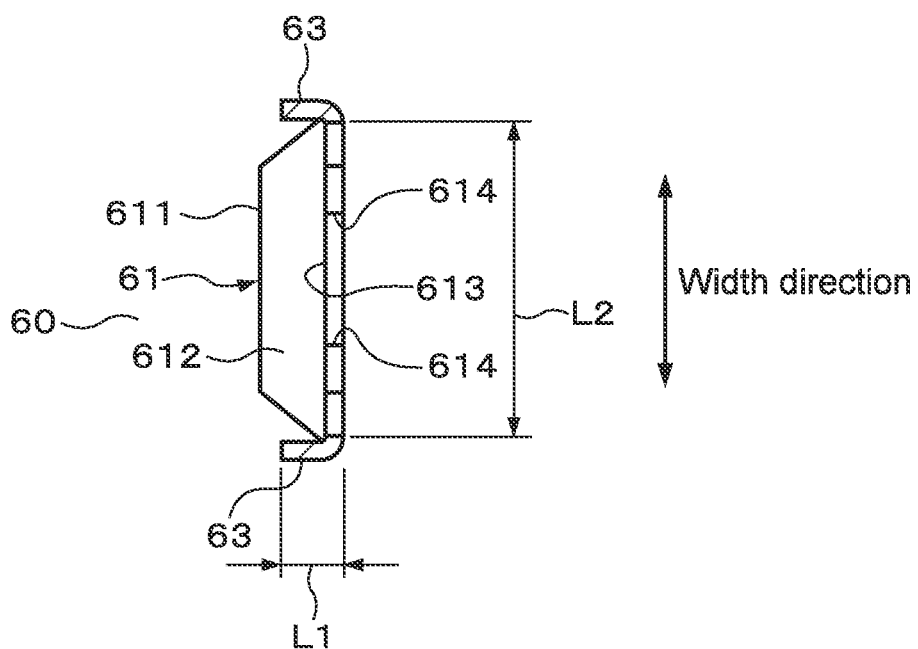
FIG. 10 is a cross-sectional view taken along line X10-X10 in FIG. 9 in the example of the motor protector according to the embodiment.

In the present embodiment, as shown in FIGS. 9 and 10, the total of the dimensions L1 in the width direction of the two connection regions 63, that is, 2×L1, is set to be smaller than the total of the dimension L2 in the width direction of the space regions 64, in this case, L2. In other words, in the present embodiment, the relationship between the total dimension 2×L1 in the width direction of the connection regions 63 and the total dimension L2 in the width direction of the space region 64 satisfies 2×L1<L2.

Furthermore, in the case of the present embodiment, the total dimension 2×L1 in the width direction of the connection regions 63 is larger than ¼ of the total L2 of the dimension L2 in the width direction of the space region 64 and also smaller than ½ of the total L2 of the dimension L2 in the width direction of the space region 64. In other words, in this case, the relationship between the total dimension 2×L1 in the width direction of the connection regions 63 and the total dimension L2 in the width direction of the space region 64 satisfies L2/4<2×L1<L2/2. Specifically, in the present embodiment, the total dimension 2×L1 in the width direction of the two connection regions 63 is set to about ⅓ of the total dimension L2 in the width direction of the space region 64. Note that the connection region 63 may also be provided only on one side in the width direction of the fixed contact point support body 60.

The two connection regions 63 are formed by bending the connection regions 63 toward the movable contact point 33 with respect to the conducting terminal pin side region 61 and the fixed contact point side region 62. In this case, each of the two connection regions 63 is bent toward the movable contact point 33 by about 90° so as to be perpendicular to the conducting terminal pin side region 61 and the fixed contact point side region 62. As a result, the fixed contact point support body 60 can have higher rigidity, particularly, enhance the rigidity in the bending direction with the connection portion to the conducting terminal pin 40 as a fulcrum as compared with a case where the connection regions 63 are not bent. In other words, the two connection regions 63 function as reinforcing portions or ribs for reinforcing the fixed contact point support body 60. In this case, the connection regions 63 is bent by about 90° only at the boundaries c1 between the connection regions 63 and the conducting terminal pin side region 61 and the boundaries c2 between the connection regions 63 and the fixed contact point side region 62 shown in FIG. 11.

Figure 8:
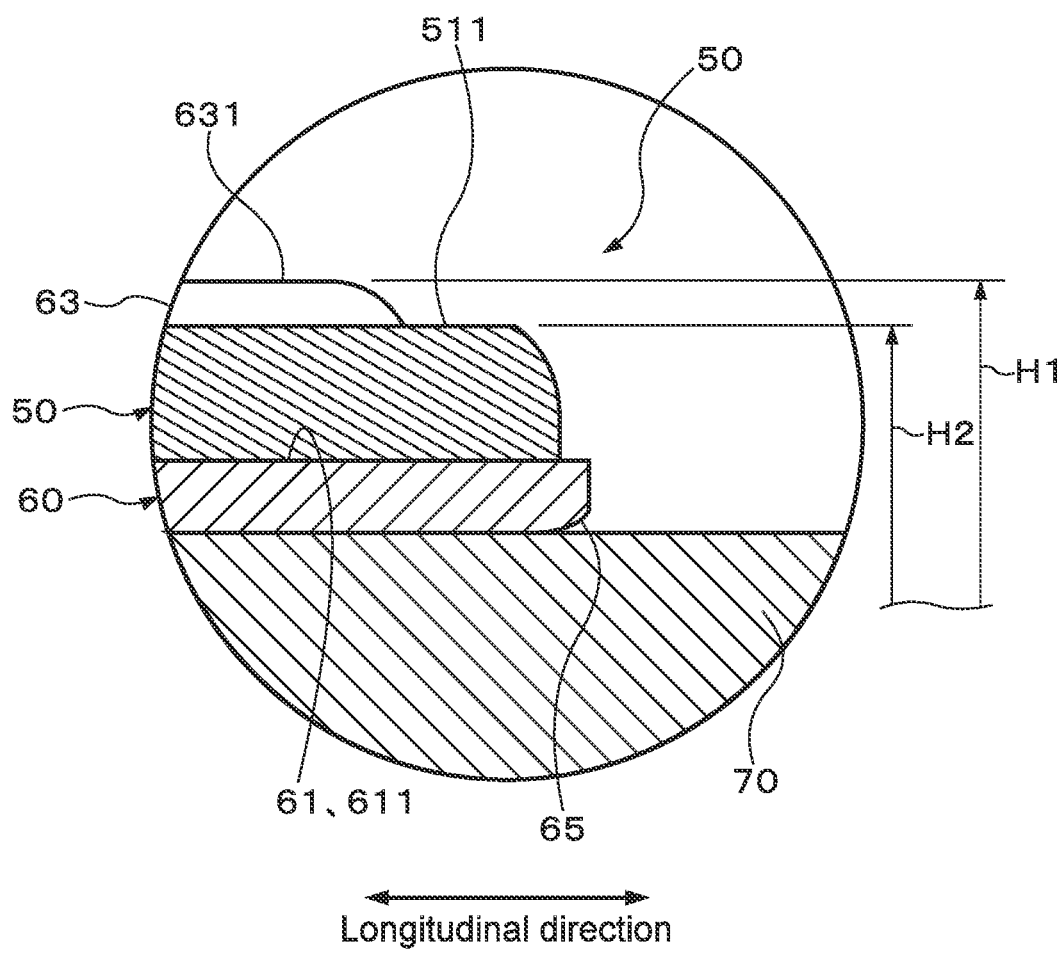
FIG. 8 is an enlarged view showing an enlarged X8 part of FIG. 7 in the example of the motor protector according to the embodiment.

In this case, as shown in FIG. 8, an edge portion 631 of the connection region 63 is located to be closer to the thermal reaction plate 32 than a top portion 511 of the fixed contact point 51. In short, the distance between the edge portion 631 of the connection region 63 and the thermal reaction plate 32 is shorter than the distance between the top portion 511 of the fixed contact point 51 and the thermal reaction plate 32. In other words, the distance H1 from the surface of the cover plate 22 to the edge portion 631 of the connection region 63 is larger than the distance H2 from the surface of the cover plate 22 to the top portion 511 of fixed contact point 51.

Figure 11:
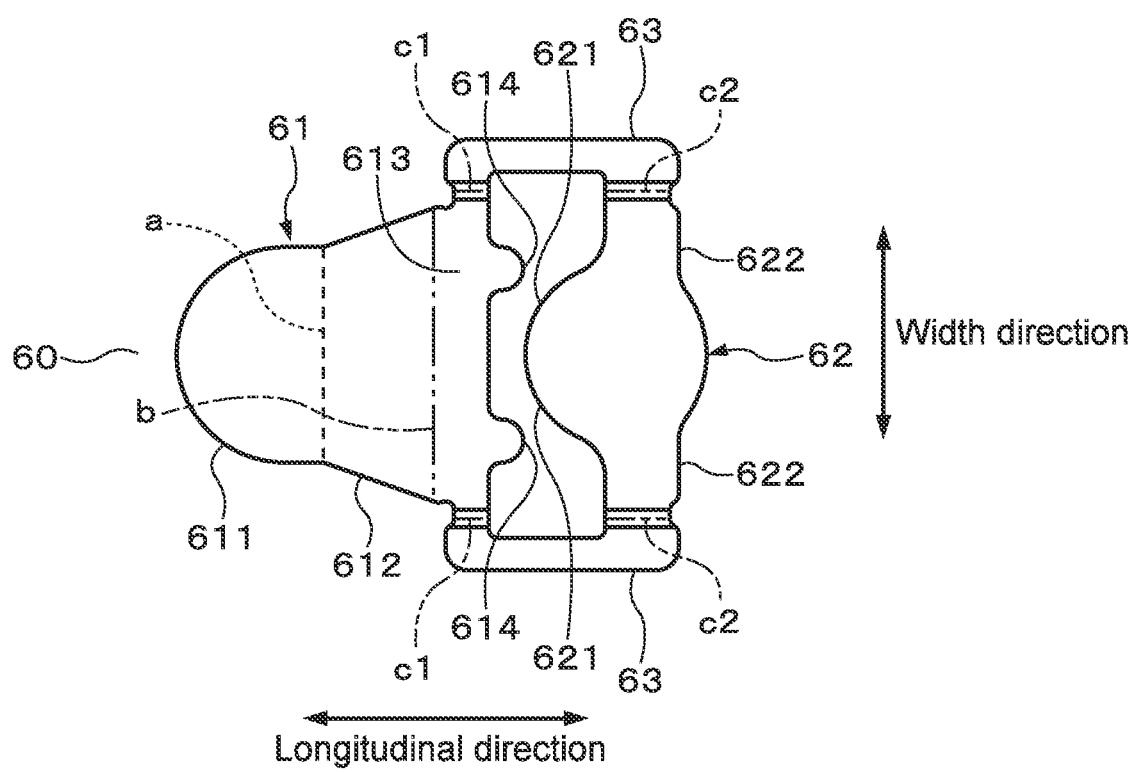
FIG. 11 is a development view showing a state before bending work on the fixed contact point support body in the example of the motor protector according to the embodiment.

In the present embodiment, in the fixed contact point support body 60, the conducting terminal pin side region 61, the fixed contact point side region 62 and the connection regions 63 are formed integrally as shown in FIG. 6 and the like by bending work on a flat plate material shown in FIG. 11. In this case, as shown in FIG. 11, in the fixed contact point support body 60 before the bending work, the respective regions corresponding to the conducting terminal pin side region 61, the fixed contact point side region 62, and the connection regions 63 are formed by punching the flat plate material with a die corresponding to the space region 64. The fixed contact point support body 60 is completed by bending a portion of a broken line a in a mountain-fold style by about 30°, bending a portion of a two-dotted chain line b in a valley-fold style by about 30°, and further bending portions of two-dotted chain lines c1, c2 in a valley-fold style by about 90°.

The spacer 70 is provided between the fixed contact point support body 60 and the cover plate 22, and has a so-called positioning function of defining the distance of the fixed contact point support body 60 from the cover plate 22. The spacer 70 is formed of an electrically insulating material such as ceramics, and has a function of electrically insulating the fixed contact point support body 60 and the cover plate 22 from each other. In this case, by using alumina ceramics or the like having good thermal conductivity for the spacer 70, heat generated when an arc occurs in the fixed contact point support body 60 or the fixed contact point 51 can be efficiently transferred to the cover plate 22 via the spacer 70, and radiated from the cover plate 22 to the outside. As a result, wear of the fixed contact points 51 can be suppressed, and the life of the motor protector 10 can be lengthened.

Figure 12:
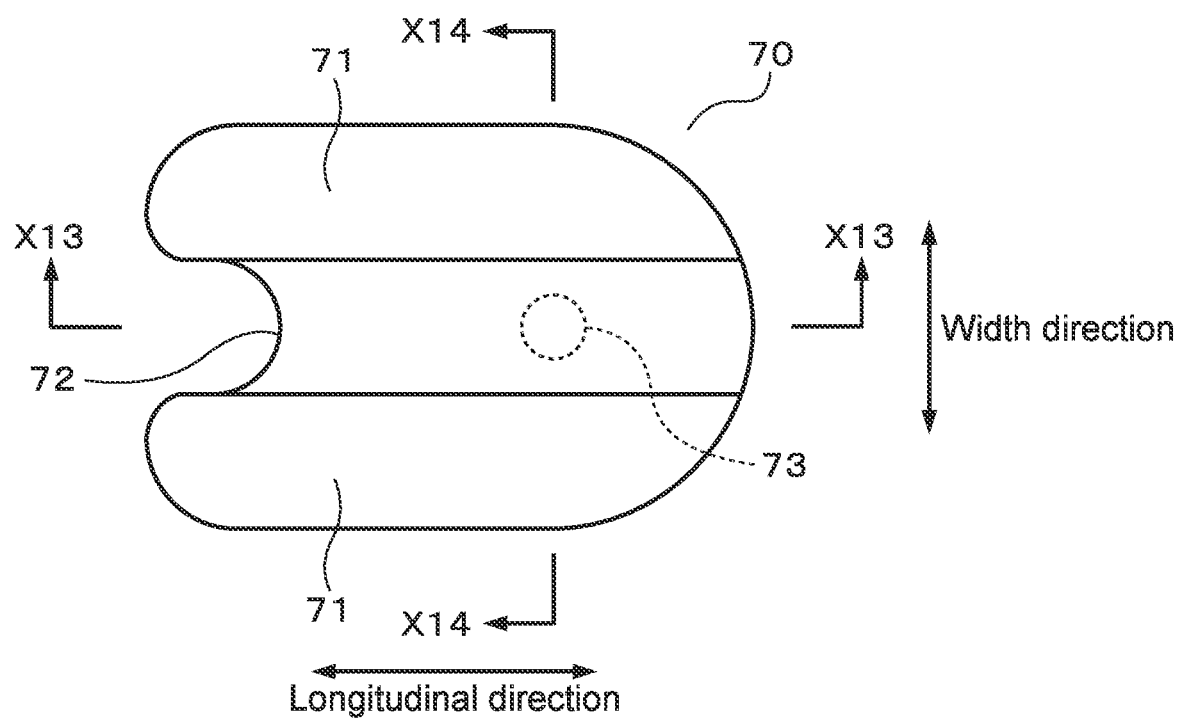
FIG. 12 is a plan view showing an example of a spacer in the example of the motor protector according to the embodiment.
Figure 13:
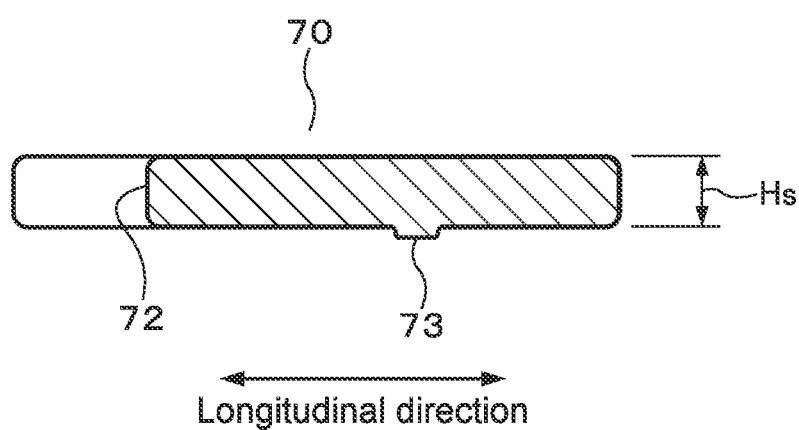
FIG. 13 is a cross-sectional view taken along line X13-X13 of FIG. 12 in the example of the motor protector according to the embodiment.
Figure 14:
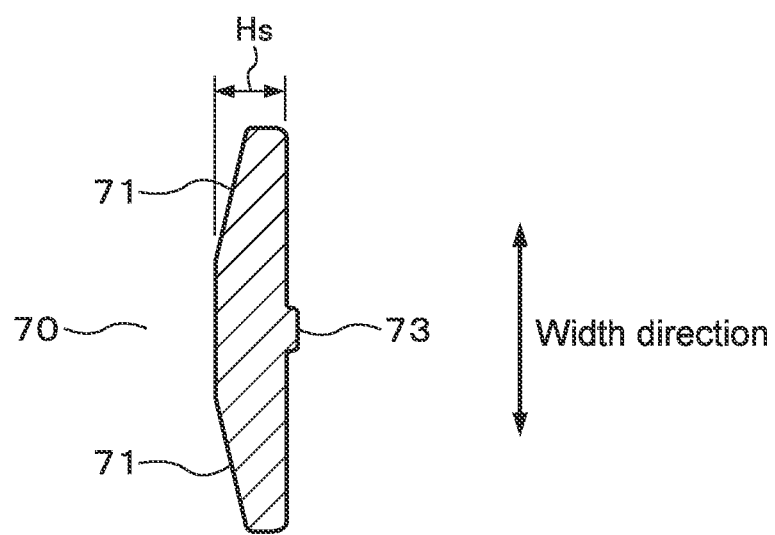
FIG. 14 is a cross-sectional view taken along line X14-X14 of FIG. 12 in the example of the motor protector according to the embodiment.

As shown in FIGS. 12, 13, and 14, the spacer 70 is formed in a substantially elliptical plate shape as a whole. The spacer 70 also includes inclined surface portions 71, a receiving portion 72 and a convex portion 73. The inclined surface portions 71 are provided on one side surface of the spacer 70, and are also provided on both sides in the width direction with respect to a center line that passes through the center in the width direction of the spacer 70 and extends in the longitudinal direction of the spacer 70. The inclined surface portions 71 are surfaces that are inclined from the center portion in the width direction of the spacer 70 to both end sides. In this case, as shown in FIG. 14, the spacer 70 is thickest at the center portion in the width direction of the spacer 70, and becomes thinner toward both the end sides in the width direction.

The receiving portion 72 is a portion which is formed by arcuately recessing a center portion in the width direction of the spacer 70 at one end portion in the longitudinal direction of the spacer 70. The diameter of the receiving portion 72 is set to a dimension which is slightly larger than the diameter of the conducting terminal pin 40. As a result, a part of the conducting terminal pin 40 can be inserted and received inside the receiving portion 72.

The convex portion 73 is provided at the center portion in the width direction of the spacer 70 and at the end portion on the opposite side to the receiving portion 72 in the longitudinal direction. The convex portion 73 is formed so as to protrude in a cylindrical shape from a surface of the spacer 70 facing the cover plate 22 to the cover plate 22 side. The convex portion 73 is provided at a position overlapping the fixed contact point 51 in plan view. In this case, a concave portion 222 in which the convex portion 73 can be inserted is formed at a position facing the convex portion 73 in the cover plate 22. The depth dimension of the concave portion 222 is slightly larger than the protruding dimension of the convex portion 73.

Figure 7:
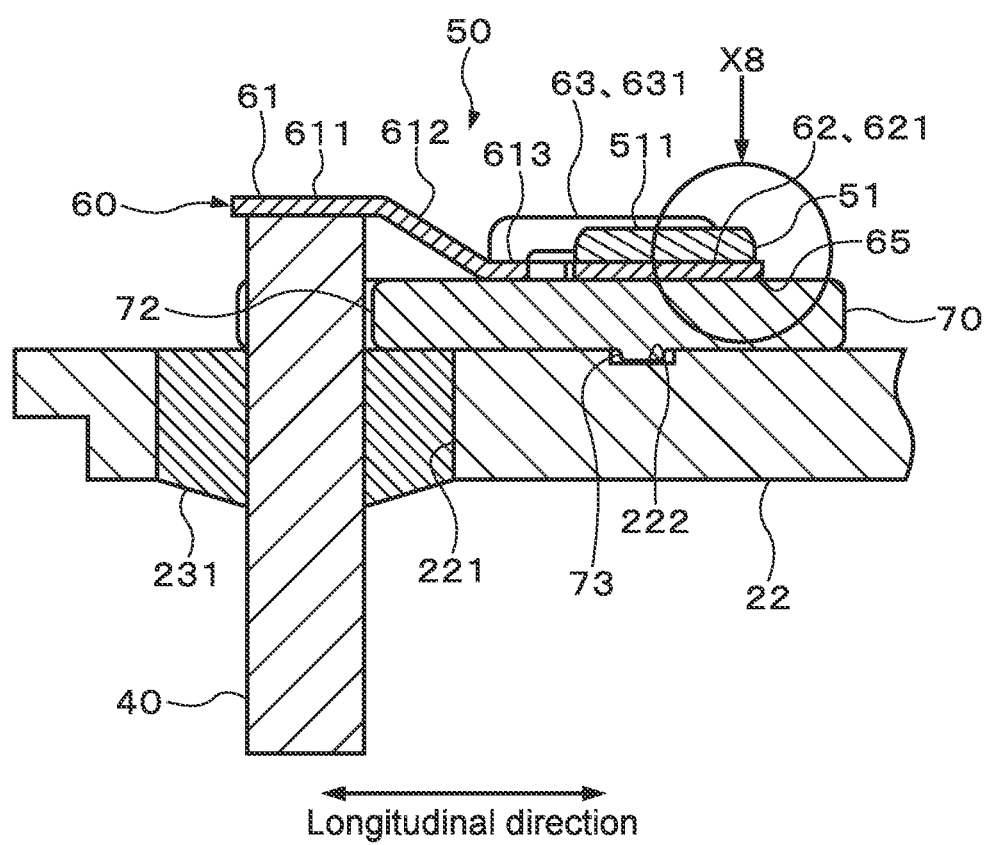
FIG. 7 is a cross-sectional view of the example of the motor protector according to the embodiment, which is taken along line X7-X7 of FIG. 6.

As shown in FIG. 7, the spacer 70 is interposed and fixed between the cover plate 22 and the fixed contact point support body 60 in a state where a part of the conducting terminal pin 40 is inserted inside the receiving portion 72 and the convex portion 73 is inserted in the concave portion 222 of the cover plate 22. The spacer 70 receives the elastic force of the fixed contact point support body 60 to be pressed against the cover plate 22 side, and fixed. In other words, the spacer 70 of the present embodiment is not fixed by welding, adhesion, a fastening member or the like. Therefore, in the case of the present embodiment, the spacer 70 is detachably mounted on the cover plate 22.

Note that the spacer 70 is not limited to the configuration described above, and may be configured to be undetachable from the cover plate 22. In this case, a method of mounting the spacer 70 can be performed as follows. In this case, the spacer 70 has a hole through which the conducting terminal pin 40 can pass. The spacer 70 is mounted on the cover plate 22 with the conducting terminal pin 40 being inserted through the hole, and then the fixed contact point support body 60 and the conducting terminal pin 40 are welded to each other.

Here, in the case of the present embodiment, a part of the conducting terminal pin 40 is inserted inside the receiving portion 72, and the convex portion 73 is inserted into the concave portion 222 of the cover plate 22, whereby the movement of the spacer 70 along the surface direction of the cover plate 22 is restricted. In other words, the receiving portion 72 and the convex portion 73 have a function of restricting the movement of the spacer 70 along the surface direction of the cover plate 22. Further, the spacer 70 is restricted from moving in a direction away from the cover plate 22 because the spacer 70 receives the pressing force from the fixed contact point support body 60. In other words, the fixed contact point support body 60 has a function of restricting the movement of the spacer 70 in the direction away from the cover plate 22.

As shown in FIG. 8, the fixed contact point support body 60 also includes a chamfered portion 65. The chamfered portion 65 is a portion obtained by chamfering a corner of an edge portion which is located on a fixed contact point 51 side in the longitudinal direction and on a spacer 70 side of the fixed contact point support body 60, and is subjected to so-called C-chamfering or R-chamfering. The chamfered portion 65 is away from both surfaces of the spacer 70.

Figure 15:
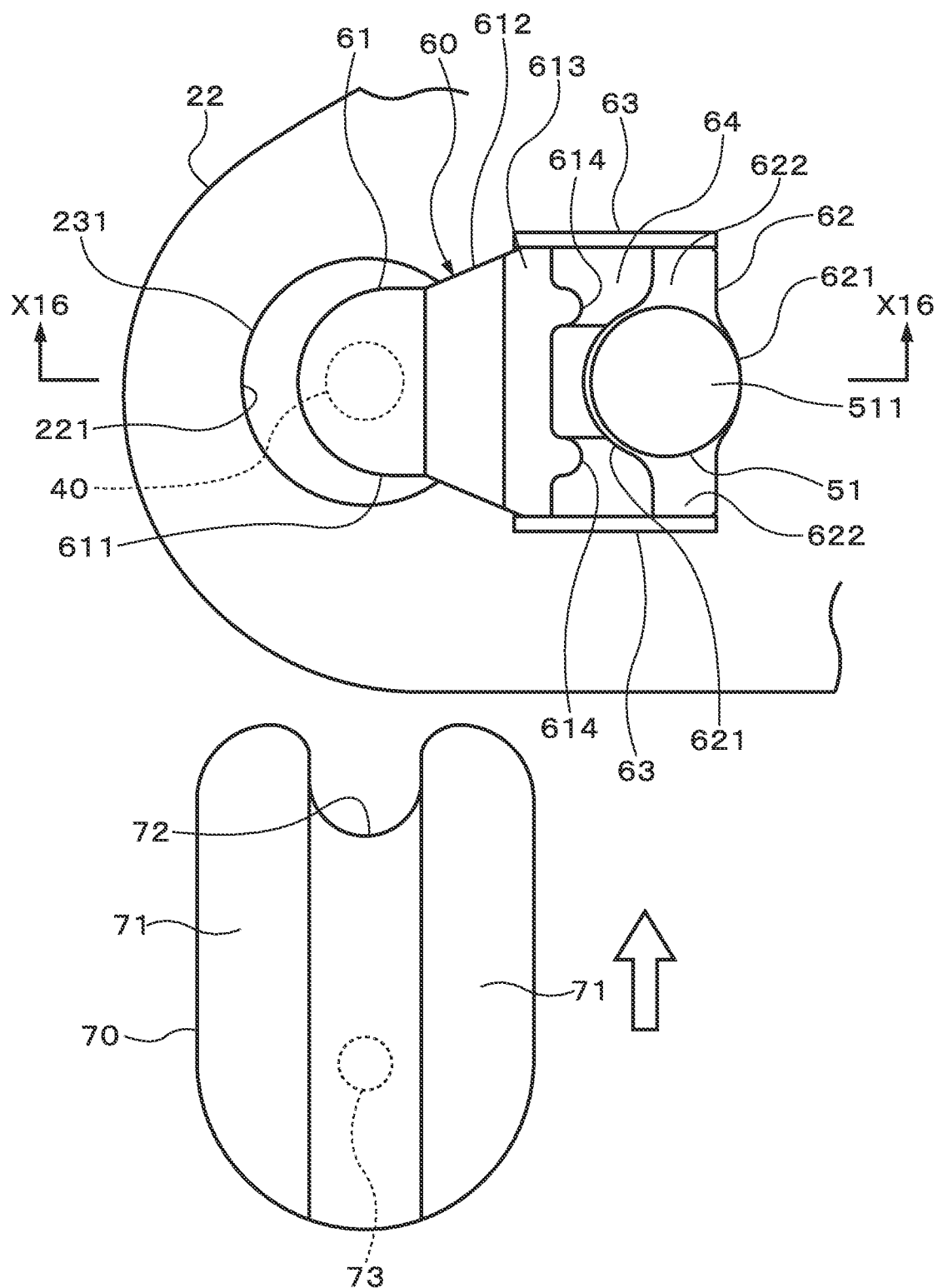
FIG. 15 is a plan view showing an example of a spacer mounting method for the example of the motor protector according to the embodiment (part 1).
Figure 16:
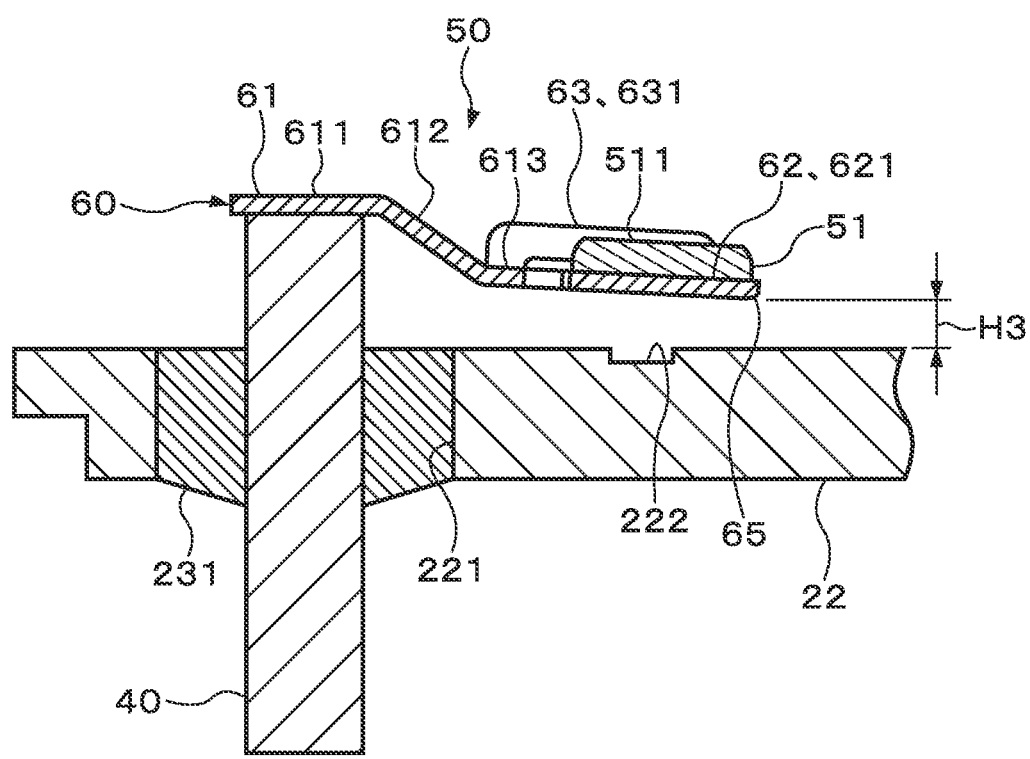
FIG. 16 is a cross-sectional view taken along line X16-X16 of FIG. 15 in the example of the motor protector according to the embodiment.
Figure 17:
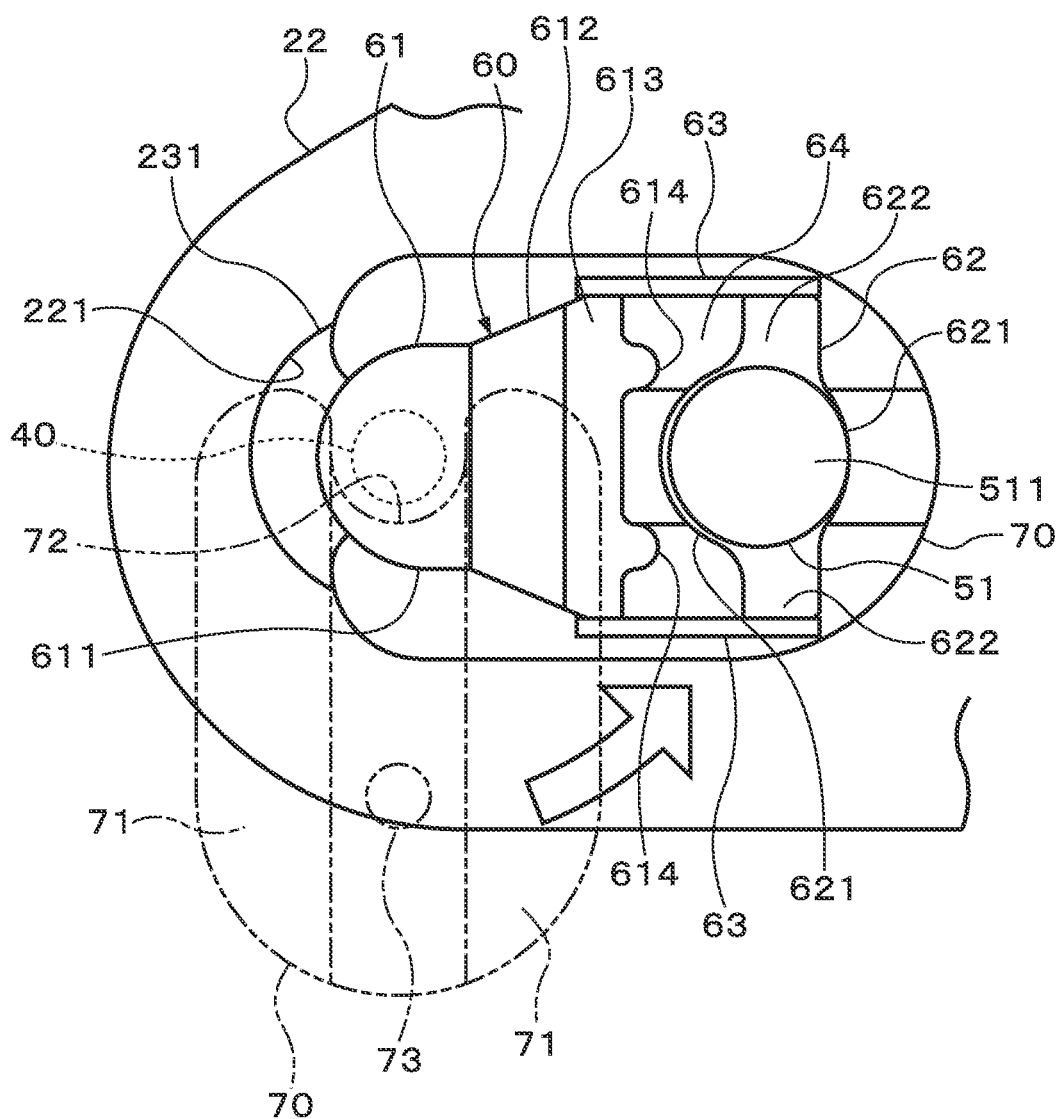
FIG. 17 is a plan view showing an example of a procedure for mounting a spacer for the example of the motor protector according to the embodiment (part 2).

The spacer 70 is mounted on the cover plate 22 as shown in FIGS. 15 to 17. In a state where the spacer 70 is not mounted between the fixed contact point support body 60 and the cover plate 22, the fixed contact point support body 60 is slightly inclined so as to descend from the conducting terminal pin 40 side to the fixed contact point 51 side as shown in FIG. 16. In this state, the height dimension H3 from the surface of the cover plate 22 to the tip portion of the fixed contact point support body 60, that is, the chamfered portion 65 is smaller than the thickness dimension Hs of the center portion in the width direction of the spacer 70, that is, the maximum thickness dimension Hs of the spacer 70 excluding the convex portion 73.

In this state, as shown in FIG. 17, an operator inserts the peripheral portion of the receiving portion 72 in between the fixed contact point support body 60 and the cover plate 22 while pressing the conducting terminal pin 40 against the inner side of the receiving portion 72. Thereafter, the operator rotates the spacer 70 with the conducting terminal pin 40 as a fulcrum to fit the convex portion 73 into the concave portion 222. As a result, the substantially whole body of the spacer 70 is pressed against and fixed to the fixed contact point support body 60 in a state where the movement of the spacer 70 in the surface direction of the cover plate 22 is restricted.

According to the preset embodiment described above, the motor protector 10 includes the hermetic container 20, the two conducting terminal pins 40, the two fixed contact point support bodies 60, the two fixed contact points 51, the two movable contact points 33, and the thermal reaction plate 32. The hermetic container 20 is airtightly configured to include the dome-shaped housing 21 and the cover plate 22 provided at the end portion on the opening side of the housing 21. The two conducting terminal pins 40 are provided in the hermetic container 20 with penetrating through the cover plate 22, and one end portion of each conducting terminal pin 40 is inserted in the hermetic container 20 while the other end portion thereof is exposed to the outside of the hermetic container 20.

The two fixed contact point support bodies 60 are provided inside the hermetic container 20 so as to correspond to the respective conducting terminal pins 40, and one end portion of each fixed contact point support body 60 is fixed to the end portion of the conducting terminal pin 40. The two fixed contact points 51 are provided inside the hermetic container 20, and each fixed contact point 51 is provided at an end portion opposite to the end portion on which the conducting terminal pin 40 is provided in each of the fixed contact point support body 60. The two movable contact points 33 are provided inside the hermetic container 20, and correspond to the two fixed contact points 51, respectively.

The thermal reaction plate 32 is provided inside the hermetic container 20, and the two movable contact points 33 are attached to the thermal reaction plate 32. In a state where the thermal reaction plate 32 is not in operation, it brings each movable contact point 33 into contact with each fixed contact point 51 to close the two fixed contact points 51. Further, when the ambient temperature inside the hermetic container 20 reaches a predetermined temperature and thus the thermal reaction plate 32 operates, the thermal reaction plate 32 is deformed in a direction in which each movable contact point 33 is away from each fixed contact point 51, thereby opening the two fixed contact points 51 and cutting off the circuit.

Figure 18:
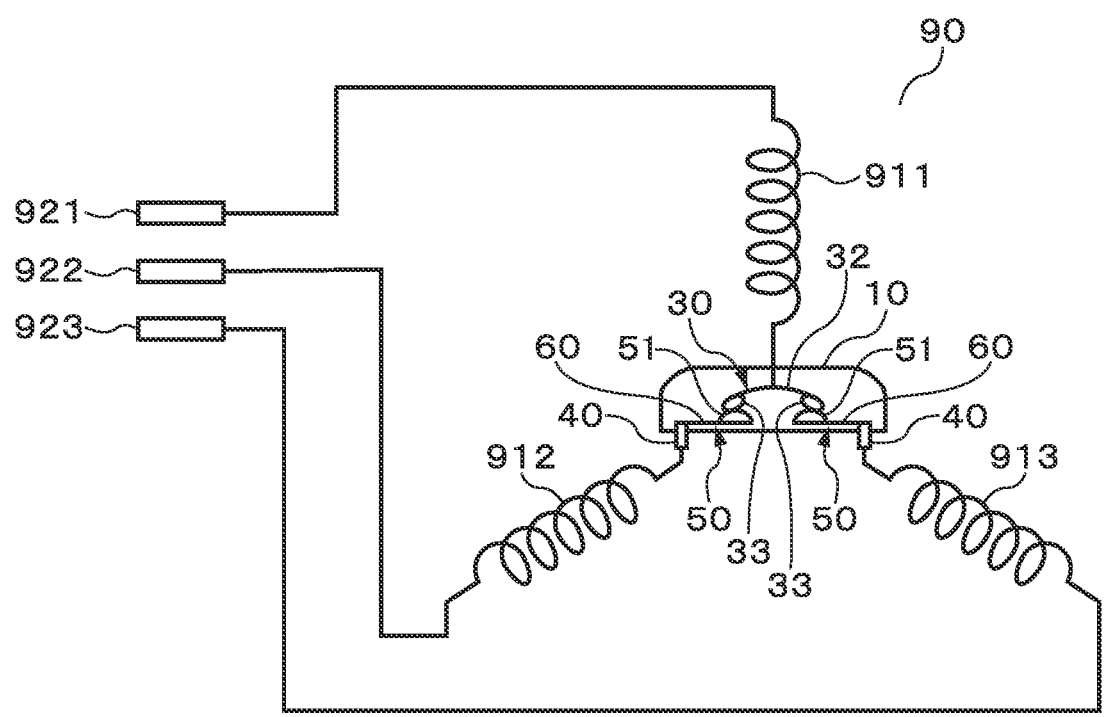
FIG. 18 is a diagram schematically showing an example of a connection mode when the motor protector according to the embodiment is applied to a three-phase motor.

The thus-configured motor protector 10 is used while being connected to the neutral point of a three-phase motor 90 as shown in FIG. 18, for example. In this case, the coil ends on the power supply side of three-phase windings 911, 912, and 913 of the three-phase motor 90 are connected to a three-phase power supply via power supply terminals 921, 922, and 923, respectively. Further, paying attention to the coil ends on the neutral point side of the windings 911, 912, 913, two of the three-phase windings 911, 912, 913 are connected to the respective conducting terminal pins 40, and electrically connected to the fixed contact points 51 via the conducting terminal pins 40 and the fixed contact point support bodies 60 of the fixed contact point mechanisms 50 are electrically connected to the fixed contact points 51. The remaining one of the three-phase windings 911, 912, 913 is connected to, for example, a metal portion outside the hermetic container 20, for example, fixed to the cover plate 22 by welding or the like, and is electrically connected to the movable contact points 33 via the cover plate 22, the housing 21, and the movable contact point mechanism 30.

In this configuration, when the rotor of the three-phase motor 90 to which the motor protector 10 is attached is locked because it starts in an open-phase state, for example, open-phase is caused in energization to the winding 911 of the motor which is connected to the metal portion outside the hermetic container 20, so that an open-phase lock current flows between the two conducting terminal pins 40. The open-phase lock current passes from the conducting terminal pin 40 on one side through the fixed contact point support body 60 and the fixed contact point 51, further passes from the movable contact point 33 on one side through the thermal reaction plate 32, then passes from the movable contact point 33 on the other side through the fixed contact point 51 and the fixed contact point support body 60 on the other side, and flows into the conducting terminal pin 40 on the other side. At this time, Joule heat is generated mainly by the open-phase lock current passing through the fixed contact point support bodies 60, so that the ambient temperature in the hermetic container 20 rises. When the ambient temperature in the hermetic container 20 rises to a predetermined temperature at which the thermal reaction plate 32 operates, the thermal reaction plate 32 operates, and deforms in a direction in which the curvature of the thermal reaction plate 32 is reversed, so that the movable contact points 33 are pulled away from the fixed contact points 51 to disconnect the two movable contact points 33 from each other. In this way, the motor protector 10 can cut off power supply to the motor to protect the motor when an open-phase lock current occurs due to the open-phase lock.

Here, when the open-phase lock current is small, the Joule heat generated in the fixed contact point support bodies 60 is also small, and thus it takes too much time for the ambient temperature inside the hermetic container 20 to rise to the operating temperature of the thermal reaction plate 32, so that it may be impossible to adequately protect the motor.

Therefore, in the present embodiment, the fixed contact point support body 60 integrally includes the conducting terminal pin side region 61, the fixed contact point side region 62 and the connection regions 63, for example, by bending a metal plate material as shown in FIG. 11. The conducting terminal pin side region 61 is a region where the conducting terminal pin 40 is provided. The fixed contact point side region 62 is a region which is arranged so that the space region 64 formed so as to penetrate through the fixed contact point support body 60 is sandwiched between the fixed contact point side region 62 and the conducting terminal pin side region 61, and provided with the fixed contact point 51. The connection regions 63 are regions which are provided across the space region 64, and connect the conducting terminal pin side region 61 and the fixed contact point side region 62. As shown in FIGS. 9 and 10, the total of the width dimensions of the connection regions 63, in this case, 2×L1, is set to be smaller than the total of the width dimension of the space region 64, in this case, L2.

According to this configuration, when the motor falls into a locked state to generate an open-phase current, the open-phase lock current bypasses the space region 64 and flows through the connection regions 63. Therefore, a long distance can be secured as a flowing distance of the open-phase lock current on the fixed contact point support body 60. Furthermore, since the total of the width dimensions of the connection regions 63 is set to be smaller than the total of the width dimension of the space region 64, the resistivity of the connection regions 63 can be made as large as possible.

As a result, the efficiency of heat generation when an open-phase lock current flows through the fixed contact point support body 60 can be increased. Further, even a small open-phase lock current efficiently heats the inside of the hermetic container 20, so that the thermal reaction plate 32 can be operated in a short time without sacrificing the overheat protection characteristics and reducing the operating temperature of the thermal reaction plate 32. As a result, the motor protector 10 of the present embodiment can appropriately protect even a motor of a compressor having a small discharge amount which could not have been properly protected by the conventional configuration because the open-phase lock current is small.

The connection regions 63 are provided on both the end sides in the width direction of the space region 64. According to this configuration, when an open-phase lock current flows through the connection regions 63 and the connection regions 63 generate heat, the inside of the hermetic container 20 can be heated as evenly as possible. As a result, the responsiveness of the thermal reaction plate 32 can be improved.

Here, when the space region 64 is formed so as to penetrate through the fixed contact point support body 60, the rigidity of the fixed contact point support body 60 as a whole is lowered by the degree corresponding to the vacancy of the space region 64. Therefore, in the present embodiment, the connection regions 63 are formed to be bent to the movable contact point 33 side with respect to the conducting terminal pin side region 61 and the fixed contact point side region 62. According to this configuration, by bending the connection regions 63 with respect to the conducting terminal pin side region 61 and the fixed contact point side region 62, bending stress can be increased at the connection regions 63. As a result, even when the space region 64 is formed to penetrate through the fixed contact point support body 60, the rigidity of the fixed contact point support body 60 as a whole can be maintained to be high. As a result, even when the motor protector 10 is repetitively operated and thus the fixed contact point support body 60 generates heat repetitively, the initial shape of the fixed contact point support body 60 can be maintained, which makes it possible to suppress characteristic change caused by the repetitive operation.

Here, when the open-phase lock current decreases, the amount of heat generated in the connection regions 63 also decreases. Therefore, in the present embodiment, the edge portion 631 of the connection region 63 is located to be closer to the thermal reaction plate 32 than the top portion 511 of the fixed contact point 51 as shown in FIG. 8. In other words, the distance H1 from the surface of the cover plate 22 to the edge portion 631 of the connection region 63 is larger than the distance H2 from the surface of the cover plate 22 to top portion 511 of the fixed contact point 51. According to this configuration, the heat generated in the connection regions 63 can be efficiently transferred to the thermal reaction plate 32 to cause the thermal reaction plate 32 to operate in a shorter time, so that it is possible to further enhance the response performance of the motor protector 10.

Further, the motor protector 10 of the present embodiment further includes the spacer 70 provided between the fixed contact point support body 60 and the cover plate 22. The fixed contact point support body 60 is fixed to the conducting terminal pin 40 in a cantilever beam state with a fixed end thereof set on the conducting terminal pin 40 side and a free end thereof set on the fixed contact point 51 side, and presses the spacer 70 against the cover plate 22 to fix the spacer 70. In other words, the spacer 70 is sandwiched and held between the fixed contact point support body 60 and the cover plate 22 by the elastic force of the fixed contact point support body 60. According to this configuration, the spacer 70 can be fixed to the cover plate 22 without fixing the spacer 70 to the cover plate 22 with an adhesive or the like, so that workability in assembling the spacer 70 can be improved.

Here, if the end portion on the free end side of the fixed contact point support body 60, that is, the edge portion facing the spacer 70 in the end portion of the fixed contact point side region 62 is formed in a rectangular shape, when the fixed contact point support body 60 thermally expands due to its heat generation and shrinks due to stop of the heat generation, the edge portion of the rectangular shape may get caught on the surface of the spacer 70. In this case, every time thermal expansion and shrinkage are repeated, the position and posture of the fixed contact point side region 62, that is, the position and posture of the fixed contact point 51 change, so that the characteristics of the motor protector 10 are affected.

Therefore, in the present embodiment, the fixed contact point support body 60 further includes the chamfered portion 65. The chamfered portion 65 is formed by chamfering a corner of an edge portion which is located on an opposite side to the conducting terminal pin 40 side and on a spacer 70 side of the fixed contact point support body 60. According to this configuration, the chamfered portion 65 can make it difficult for the end portion of the fixed contact point side region 62 to get caught on the surface of the spacer 70 when the fixed contact point support body 60 expands and shrinks. As a result, even when thermal expansion and shrinkage are repeated, the position and posture of the fixed contact point side region 62, that is, the position and posture of the fixed contact point 51 are less likely to change, so that stable operation characteristics can be achieved even when the motor protector 10 is operated repetitively.

Further, since the fixed contact point support body 60 has the space region 64, the area through which the open-phase lock current flows is smaller than that of a structure which does not have the space region 64. Therefore, the conducting terminal pin side region 61 and the fixed contact point side region 62 are more likely to generate heat. In particular, since the conducting terminal pin side region 61 is in a cantilever beam state with the connection portion thereof with the conducting terminal pin 40 as a fulcrum, when the conducting terminal pin side region 61 generates heat and thus thermally expands, the conducting terminal pin side region 61 warps with the connection portion thereof with the conducting terminal pin 40 as a fulcrum. As the conducting terminal pin side region 61 warps, the fixed contact point side region 62 connected to the conducting terminal pin side region 61 via the connection regions 63 also moves, so that the position of the fixed contact point 51 becomes difficult to stabilize.

In contrast, in the present embodiment, the conducting terminal pin side region 61 has a trapezoidal portion 612 which is formed in a trapezoidal shape spreading toward the fixed contact point side region 62. According to this configuration, it is possible to broadly diffuse the open-phase lock current flowing through the fixed contact point side region 62, and suppress heat generation in the fixed contact point side region 62 which contributes little to the heating of the thermal reaction plate 32, so that expansion of the fixed contact point side region 62 can be suppressed. As a result, it is possible to suppress the movement of the fixed contact point side region 62 and stabilize the position of the fixed contact point 51.

Moreover, when the fixed contact point support body 60 presses the spacer 70 against the cover plate 22 to hold the spacer 70, the conducting terminal pin side region 61 mainly functions as a spring. However, when the temperature of the conducting terminal pin side region 61 increases due to heat generation, the spring characteristics change, and as a result, it becomes difficult to properly press the spacer 70 against the cover plate 22 and hold the spacer 70.

In contrast, according to the present embodiment, it is possible to suppress heat generation in the conducting terminal pin side region 61. As a result, even when an open-phase lock current flows, it is possible to suppress the effect on the spring characteristics of the conducting terminal pin side region 61, so that the spacer 70 can be appropriately pressed against the cover plate 22 and held.

Further, in this case, the boundary portion between the conducting terminal pin side region 61 and the connection region 63 is subjected to bending work, that is, plastic working. For this reason, stress caused by the plastic working remains in the boundary portion between the conducting terminal pin side region 61 and the connection region 63, and therefore the boundary portion is easily deformed by heat generation. On the other hand, according to the present embodiment, heat around the boundary portion between the conducting terminal pin side region 61 and the connection region 63 can be diffused by the trapezoidal portion 612, so that it is possible to suppress deformation caused by heat generation in the boundary portion between the conducting terminal pin side region 61 and the connection region 63.

Here, in the case of mass-production of motor protectors 10, it is assumed that a large number of fixed contact point support bodies 60 will be simultaneously manufactured by using a mold or the like. When manufacturing the fixed contact point support body 60, it is assumed that a large number of fixed contact point support bodies 60 are stocked and transported while accommodated in one container or the like. However, the fixed contact point support body 60 has the space region 64, and thus if a plurality of fixed contact point support bodies 60 are accommodated in the same container, the fixed contact point support bodies 60 would be stuck in the space regions 64 of the other fixed contact point support bodies 60, so that it becomes difficult to pick up the fixed contact point support bodies one by one. As a result, the workability in assembling the fixed contact point support body 60 may deteriorate, and the productivity of the motor protector 10 deteriorates.

Therefore, the conducting terminal pin side region 61 has at least one protruding portion 614 that protrudes to the fixed contact point side region 62. In the case of the present embodiment, the conducting terminal pin side region 61 has two protruding portions 614. According to this configuration, it is possible to reduce the distance between the conducting terminal pin side region 61 and the fixed contact point side region 62 while ensuring the distance of the route through which the open-phase lock current flows. As a result, even when a plurality of fixed contact point support bodies 60 are accommodated in the same container, the fixed contact point support bodies 60 can be made difficult to be stuck into the space regions 64 of the other fixed contact point support bodies 60. As a result, it is possible to improve the workability in assembling the fixed contact point support body 60, and thus to improve the productivity of the motor protector 10.

In the present embodiment, in the fixed contact point support body 60, the rectangular portion 613, the protruding portion 614, and the fixed contact point side region 62 are formed to be flush with one another. Therefore, in the fixed contact point support body 60, the portions of the rectangular portion 613, the protruding portion 614, and the fixed contact point side region 62 which face the spacer 70 are brought into surface contact with the spacer 70, thereby pressing the spacer 70 against the cover plate 22 side.

On the other hand, for example, the protruding portion 614 may be configured to be slightly bent to the spacer 70 side. In this case, the fixed contact point support body 60 presses the spacer 70 against the cover plate 22 by coming into contact with the spacer 70 at three points of the two protruding portions 614 and the tip portion of the fixed contact point side region 62. According to this configuration, the fixed contact point support body 60 is in point contact with the spacer 70 at the three points. Therefore, for example, even if the fixed contact point support body 60 repeats thermal expansion and shrinkage, the contact position to the spacer 70 hardly changes. As a result, the spacer 70 can be stably held, and the position of the fixed contact point 51 with respect to the spacer 70 can also be stabilized.

The embodiment described above has been presented as an example, and it does not intend to limit the scope of the invention. This novel embodiment can be implemented in various other modes, and various omissions, replacements, and changes can be made without departing from the scope of the invention. The present embodiment and its modifications are included in the scope and gist of the invention, and are included in the scope of the invention described in the claims and its equivalents.

The invention claimed is:
1. A motor protector comprising:
a hermetic container is airtight and includes a dome-shaped housing and a cover plate, the cover plate being provided at an end portion on an opening side of the housing;
two conducting terminal pins, each conducting terminal pin being provided in the hermetic container so as to penetrate through the cover plate, one end portion of the conducting terminal pin being inserted inside the hermetic container, an other end portion of the conducting terminal pin being exposed to an outside of the hermetic container;
two fixed contact point support bodies, each fixed contact point support body being provided inside the hermetic container so as to correspond to a respective one of the conducting terminal pins, one end portion of the fixed contact point support body being fixed to the one end portion of the conducting terminal pin;

two fixed contact points, each fixed contact point being provided inside the hermetic container, the fixed contact point being provided at an end portion of a respective one of the two fixed contact point support bodies, the end portion being opposite to an end portion of the fixed contact point support body where the conducting terminal pin is provided;

two movable contact points provided inside the hermetic container and corresponding to the two fixed contact points; and a thermal reaction plate provided inside the hermetic container, the two movable contact points being attached to the thermal reaction plate, the thermal reaction plate being configured to bring each of the movable contact points into contact with a respective one of the fixed contact points to close the two fixed contact points in a normal state where the thermal reaction plate is not in operation, and move the movable contact point in a direction away from the respective one of the fixed contact points to open the two fixed contact points when the thermal reaction plate operates due to an ambient temperature inside the hermetic container reaching a predetermined temperature, wherein the fixed contact point support body is formed from a bent metal plate, to integrally include a conducting terminal pin side region where the conductive terminal pin is provided, a fixed contact point side region where the fixed contact point is provided, the fixed contact point side region being arranged such that a space region which is a hole or a cut-out penetrates through the fixed contact point support body is sandwiched between the conducting terminal pin side region and the fixed contact point side region, and a connection region provided across the space region and connecting the conducting terminal pin side region and the fixed contact point side region, wherein, when a direction perpendicular to a direction in which the conducting terminal pin side region and the fixed contact point side region are mutually connected to each other and parallel to the cover plate is defined as a width direction, a total dimension of the connection region in the width direction is set to be smaller than a total dimension of the space region in the width direction, wherein the fixed contact point side region has a circular portion formed in such a shape that a center portion in the width direction bulges circularly, wherein the conducting terminal pin side region includes at least one protruding portion protruding toward the fixed contact point side region, and wherein a minimum distance between the conducting terminal pin side region of the fixed contact point support body and the fixed contact point side region of the fixed contact point support body, including the at least one protruding portion and the circular portion, avoids an electrical connection even when an open-phase lock current flows.

2. The motor protector according to claim 1, wherein the connection region is provided on each of both end sides in the width direction of the space region.

3. The motor protector according to claim 2, wherein the connection region is bent toward the movable contact points with respect to the conducting terminal pin side region and the fixed contact point side region.

4. The motor protector according to claim 3, wherein an edge portion of the connection region is located to be closer to the thermal reaction plate than a top portion of the fixed contact point.

5. The motor protector according to claim 1, further comprising a spacer provided between the fixed contact point support body and the cover plate, wherein
the fixed contact point support body is fixed to the conducting terminal pin in a cantilever beam state in which a side of the conducting terminal pin of the fixed contact point support body serves as a fixed end and a side of the fixed contact point of the fixed contact point support body serves as a free end, and presses the spacer against the cover plate to fix the spacer.

6. The motor protector according to claim 5, wherein the fixed contact point support body further includes a chamfered portion in which a corner of an edge portion on an opposite side to the side of the conducting terminal pin and on a side of the spacer of the fixed contact point support body is chamfered.

7. The motor protector according to claim 1, wherein the conducting terminal pin side region of the fixed contact point support body includes a trapezoidal portion formed in a trapezoidal shape that spreads toward the fixed contact point side region of the fixed contact support body.

* * * * *